United States Patent
Na

(10) Patent No.: US 8,485,226 B2
(45) Date of Patent: Jul. 16, 2013

(54) THREE-WAY VALVE INTEGRATED WITH RADIATOR

(75) Inventor: Sung Wook Na, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 332 days.

(21) Appl. No.: 12/952,069

(22) Filed: Nov. 22, 2010

(65) Prior Publication Data

US 2012/0060954 A1    Mar. 15, 2012

(30) Foreign Application Priority Data

Sep. 13, 2010  (KR) .................. 10-2010-0089247

(51) Int. Cl.
  *F01P 7/14*  (2006.01)
(52) U.S. Cl.
  USPC ............. 137/625.47; 123/41.1; 137/625.29
(58) Field of Classification Search
  USPC .......... 137/599.14, 625.29, 625.47; 165/103; 123/41.1
  See application file for complete search history.

(56) References Cited

U.S. PATENT DOCUMENTS

| | | | | |
|---|---|---|---|---|
| 763,724 A | * | 6/1904 | Collis | 237/73 |
| 1,400,925 A | * | 12/1921 | Wolf | 123/41.1 |
| 2,854,027 A | * | 9/1958 | Kaiser et al. | 137/625.41 |
| 3,190,584 A | * | 6/1965 | Gire et al. | 244/52 |
| 4,644,909 A | * | 2/1987 | Nishikata et al. | 123/41.1 |
| 4,819,694 A | * | 4/1989 | Jiang | 137/625.47 |
| 5,617,815 A | * | 4/1997 | Spies et al. | 123/41.1 |
| 6,164,248 A | * | 12/2000 | Lehmann | 123/41.1 |
| 6,418,966 B2 | * | 7/2002 | Loo | 137/625.47 |
| 6,799,631 B2 | | 10/2004 | Acre | |
| 6,997,143 B2 | * | 2/2006 | Piccirilli et al. | 123/41.1 |
| 7,293,535 B2 | * | 11/2007 | Dobler et al. | 123/41.12 |
| 7,449,258 B2 | | 11/2008 | Zanoni et al. | |
| 7,537,850 B2 | * | 5/2009 | Yamada | 429/413 |
| 7,578,139 B2 | * | 8/2009 | Nishikawa et al. | 62/228.3 |
| 2007/0034365 A1 | | 2/2007 | Ringholz | |

FOREIGN PATENT DOCUMENTS

| | | |
|---|---|---|
| JP | 06221154 A | 8/1994 |
| JP | 2003239737 A | 8/2003 |
| JP | 2006-112428 A | 4/2006 |
| KR | 10-2005-0089176 | 9/2005 |
| KR | 10-2009-0058095 A | 6/2009 |

* cited by examiner

*Primary Examiner* — John K Fristoe, Jr.
*Assistant Examiner* — Frederick D Soski
(74) *Attorney, Agent, or Firm* — Edwards Wildman Palmer LLP; Peter F. Corless

(57) ABSTRACT

The present invention relates to a three-way valve that is integrally formed with an outlet of a radiator for use in a fuel cell vehicle that advantageously improves thermal management of a fuel cell stack by eliminating the need for the bypass loop of a conventional system.

3 Claims, 9 Drawing Sheets

THREE-WAY VALVE INTEGRATED WITH RADIATOR

CROSS-REFERENCE TO RELATED APPLICATION

This application claims under 35 U.S.C. §119(a) the benefit of Korean Patent Application No. 10-2010-0089247 filed Sep. 13, 2010, the entire contents of which are incorporated herein by reference.

BACKGROUND (a) Technical Field

The present invention relates to a three-way valve integrated with a radiator for a vehicle. More particularly, it relates to a three-way valve that is integrally formed with an outlet of a radiator for use in a fuel cell vehicle that advantageously improves thermal management of a fuel cell stack.

(b) Background Art

In general, a fuel cell stack for a vehicle provides an optimal output when coolant that is maintained at an optimal temperature is supplied to the inside of the fuel cell stack.

Accordingly, it is very important to ensure a stable output of the fuel cell stack by properly controlling the temperature of the coolant that is fed into the fuel cell stack. To this end, a thermal management system (TMS) is typically employed in a fuel cell vehicle as a means for maintaining the temperature of the fuel cell stack.

A convention thermal management system for regulating the temperature of a fuel cell stack is shown in FIG. 1. Generally, a conventional TMS includes a fuel cell stack 100, a pump 110, a radiator 120, a heater 130, a bypass loop 140 extending from pump 110, and a radiator loop 150 extending from the radiator 120, which constitute a coolant circulation loop.

In the conventional TMS, the flow of the coolant in each loop is controlled by an electronic three-way valve 160.

In particular, the bypass loop 140 is generally employed to provide smooth operating conditions by rapidly increasing the system operating temperature during initial start-up.

On the other hand, when the system becomes overheated or exceeds a predetermined operating temperature established in the three-way valve 160, the three-way valve 160 opens the radiator loop 150 to supply cold water. The cold water supply, in turn, reduces the coolant temperature.

That is, the three-way valve 160 in a conventional TMS is generally used to mix the hot water of the bypass loop 140 and the cold water of the radiator loop 150 to maintain a specific temperature at which the fuel cell stack provides an optimal output efficiency.

For example, during initial system start-up, the coolant temperature is typically low because the amount heat produced by the fuel cell stack is low. Under these conditions, the coolant typically flows along a circulation line connected between the pump 110, the three-way valve 160, the heater 130, and the fuel cell stack 100. This circulation path occurs because it is not generally necessary under initial start-up conditions to send the coolant to the radiator as the coolant temperature is already low.

However, when a predetermined period of time elapses after the initial start-up conditions, the amount of heat generated by the fuel cell stack becomes increased. Accordingly, as the temperature of the coolant flowing through the bypass loop 140 is rapidly increased, the three-way valve shuts off the bypass loop 140 and opens the radiator loop 150 in an appropriate manner such that the coolant flows along a circulation line connected between the fuel cell stack 100, the pump 110, the radiator 120, the radiator loop 150, the three-way valve 160, and the heater 130.

Generally in operation, the three-way valve 160 receives a signal indicating the temperature of an inlet of the fuel cell stack 100 and appropriately controls the degree of opening of both loops (i.e., the bypass loop 140 and the radiator loop 150) in order to supply the coolant at a constant temperature to the fuel cell stack, regardless of the external environment.

However, the conventional TMS described above is disadvantageous because of the requirement of both the bypass loop and radiator loop.

That is, the conventional TMS cooling systems known in the art for regulating the temperature of the fuel cell stack of a fuel cell vehicle require both the bypass loop and the radiator loop to achieve the proper balance between rapidly heating the system during initial start-up and cooling the system when overheated. The requirement of both loops in this manner by the conventional TMS known in the art result in variety of disadvantages, including, higher manufacturing costs, increased vehicular weight, and restrictions as to the freedom of system design. These disadvantages result in an overall reduction in the efficiency of known TMS. An improved system that overcomes these disadvantages would be a welcome advancement in the art.

The above information disclosed in this Background section is only for enhancement of understanding of the background of the invention. Therefore the above may contain information that does not form the prior art that is already known in this country to a person of ordinary skill in the art.

SUMMARY OF THE DISCLOSURE

The present invention overcomes the above-described problems associated with conventional thermal management systems for regulating the temperature of fuel cell stacks in fuel cell vehicles. Accordingly, the present invention provides a three-way valve which is integrated with an outlet of a radiator to eliminate the bypass loop of a conventional thermal management system. The invention thus results in a reduction in manufacturing cost, a reduction in weight, and an improvement in the degree of freedom in design by providing an improved and advantageously simplified thermal management system for use in a fuel cell vehicle.

In one aspect, the present invention provides a three-way valve that is integrated with a radiator. The three-way valve can include: an actuator; a housing; a cover; and a valve mounted in the housing and rotatably connected to a shaft of the actuator to selectively control two inlet ports and an outlet port of the housing. The housing advantageously can include the two inlet ports which are connected to a radiator and the outlet port which is connected to a fuel cell stack and which is integrally formed with one side of the radiator such that hot water from the fuel cell stack and cold water from the radiator are properly mixed together and supplied or returned to the fuel cell stack.

In a preferred embodiment, the two inlet ports of the housing may define an included angle of 90° and extend in a radial direction of the housing and the outlet port may extend in an axial direction of the housing. That is, the two inlet ports may be joined to the housing whereby the longitudinal axes of the inlet ports are generally perpendicular (i.e., at about 90°) to the longitudinal axis of the housing and wherein the longitudinal axes of the inlet ports are at about 90° from one another.

In another preferred embodiment, one of the two inlet ports may be connected to an upper head of the radiator through a bypass hose and the other of the two inlet ports may be directly connected to a lower head of the radiator.

In still another preferred embodiment, the three-way valve of the invention may include a cylindrical body and a shaft member integrally formed in the rear center of the body of the three-way valve and connected to the shaft of an actuator. The body of the valve may include a flow path connected in the axial direction and in the radial direction.

Other aspects and preferred embodiments of the invention are discussed infra.

The above and other features and advantages of the present invention will be apparent from or are set forth in more detail in the accompanying drawings, which are incorporated in and form a part of this specification, and the following Detailed Description, which together serve to explain by way of example the principles of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
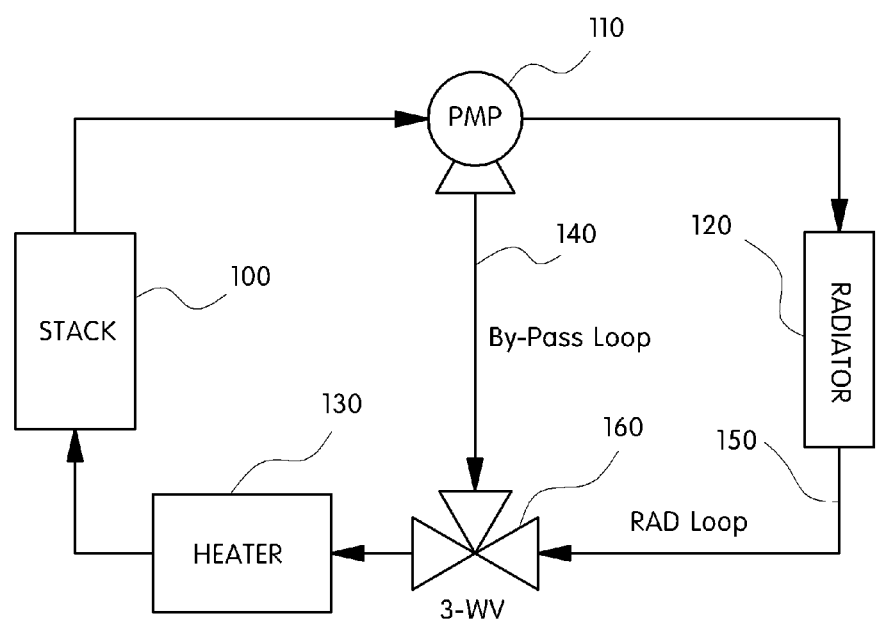
FIG. 1 is a schematic diagram showing a conventional thermal management system (TMS) for a fuel cell vehicle.

Reference numerals set forth in the Drawings includes reference to the following elements as further discussed below:

| 10: actuator | 11: housing |
| 12: cover | 13: valve |
| 14: radiator | 15a and 15b: inlet ports |
| 16: outlet port | 17: upper head |
| 18: bypass hose | 19: lower head |
| 20: bearing | 21: oil seal |
| 22: radiator inlet | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. To the contrary, the invention is intended to cover not only the exemplary embodiments, but also various alternatives, modifications, equivalents and other embodiments, which may be included within the spirit and scope of the invention as defined by the appended claims.

Figure 2:
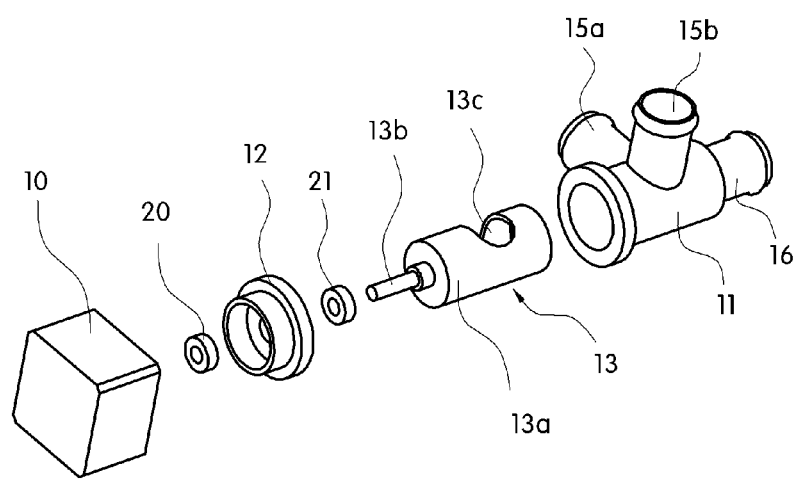
FIG. 2 is an exploded perspective view showing an embodiment of the three-way valve of the invention which is integrated with a radiator in accordance with a preferred embodiment of the present invention.
Figure 3A:
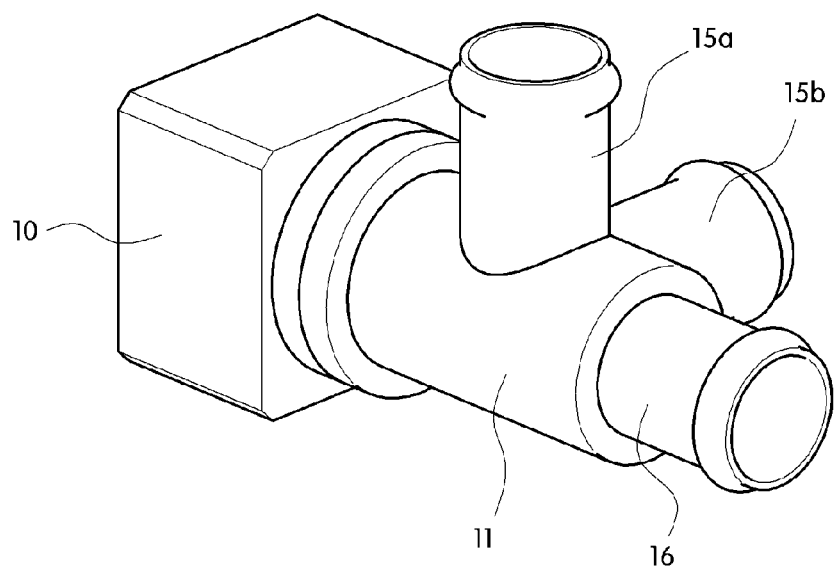
FIGS. 3A and 3C are assembled perspective views showing the three-way valve integrated with a radiator in accordance with a preferred embodiment of the present invention.
Figure 3B:
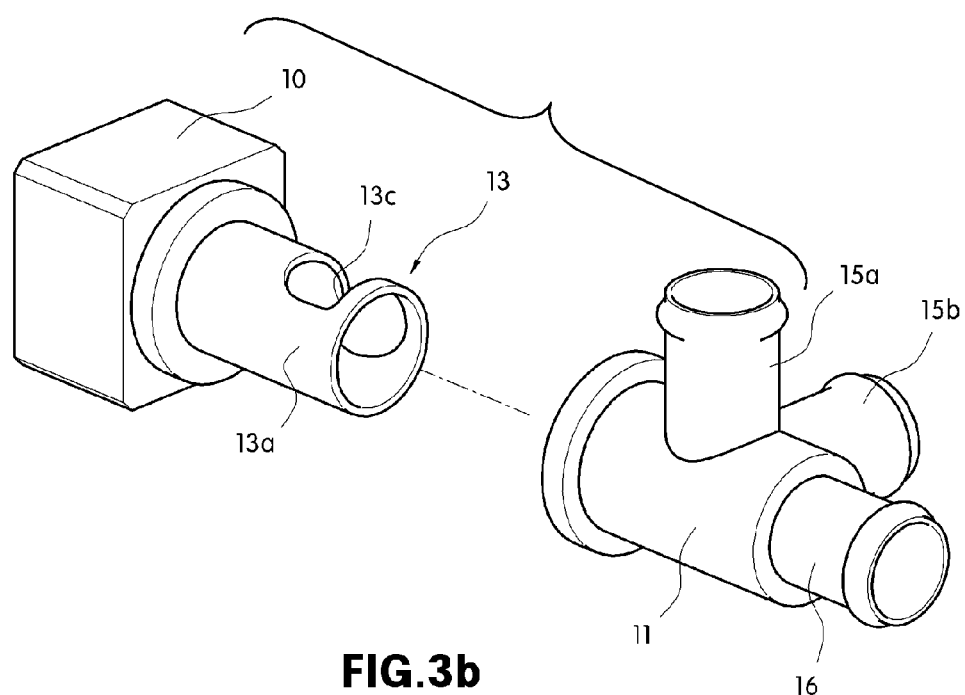
FIG. 3B is an exploded view showing the three-way valve integrated with a radiator in accordance with a preferred embodiment of the present invention.
Figure 3C:
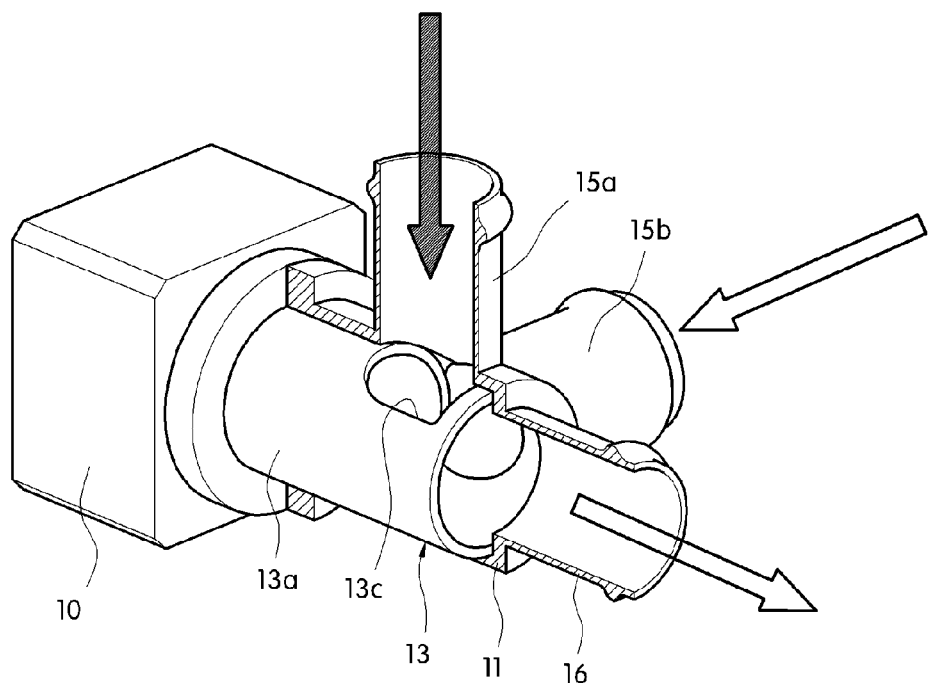

FIG. 2 is an exploded perspective view showing a three-way valve integrated with a radiator in accordance with a preferred embodiment of the present invention. FIGS. 3A, 3B, and 3C are assembled perspective views of the embodiment of FIG. 2 showing the three-way valve integrated with a radiator in accordance with a preferred embodiment of the present invention.

Figure 4:
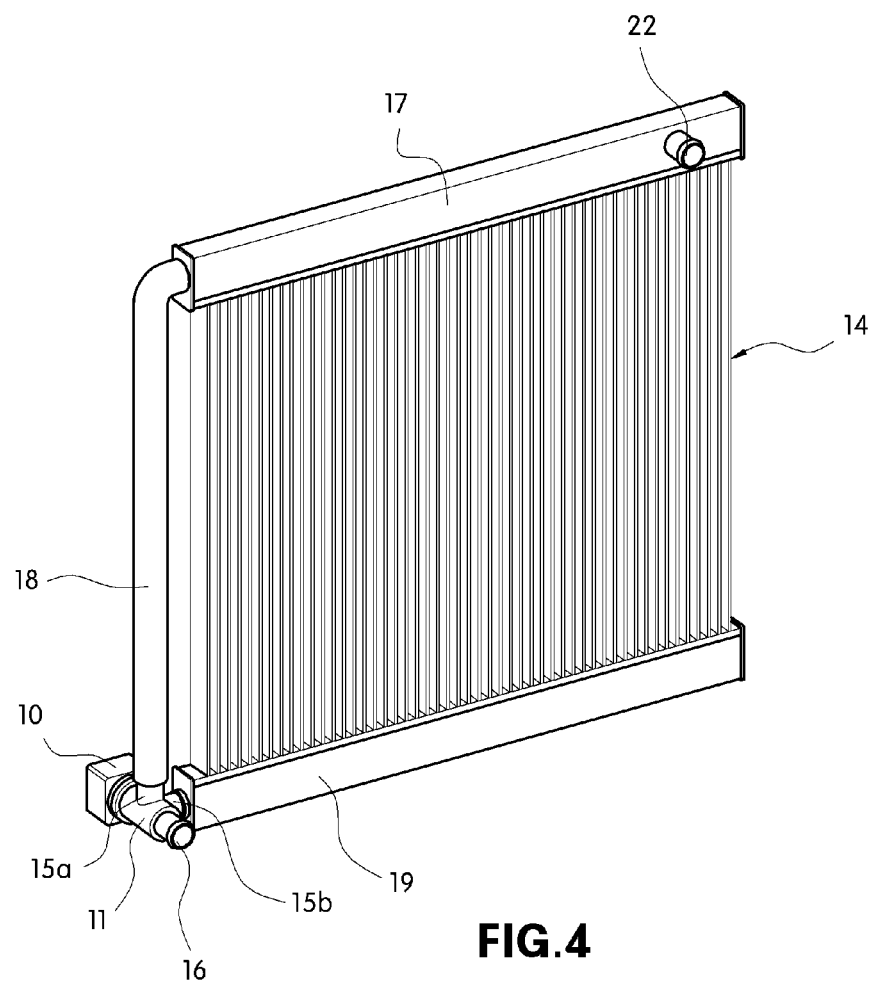
FIG. 4 is a perspective view showing the installation of the three-way valve integrated with a radiator in accordance with a preferred embodiment of the present invention.

As shown in FIG. 4, the three-way valve is integrally connected with one side of the bottom of a radiator 14, and this integration of the three-way valve and the radiator 14 achieves a compact structure for a thermal management system (TMS) module.

For this purpose, as shown in FIGS. 2 and 3a-3c, the three-way valve includes a valve 13 for controlling the flow of coolant, an actuator 10 as a drive source to control rotation of valve 13, a housing 11 for accommodating the valve 13, a cover 12, a bearing 20 and an oil seal 21. The bearing 20 and oil seal 21 are placed between the actuator 10 and the cover 12.

The valve 13 can include a cylindrical body 13a and a shaft member 13b. The shaft member 13b can be integrally formed in the rear center of the cylindrical body 13a and can be connected to a shaft (not shown) of the actuator 10 such that the valve 13 is rotated by the operation of the actuator 10.

In a particular embodiment, the body 13a of the valve 13 can include a flow path 13c connected in the axial direction and in the radial direction, respectively. The flow path 13c is connected to an outlet port 16, which will be described later, through an opening in the axial direction. The flow path 13c can be selectively connected to one of two inlet ports 15a and 15*b* or simultaneously connected to both the inlet ports 15*a* and 15*b* through an opening in the valve 13 in the radial direction.

In another particular embodiment, the valve 13 is concentrically accommodated in the housing 11, i.e., the valve 13 is positioned within the housing 11. The cover 12 is assembled to the rear of the housing 11 accommodating or integrally connected to the valve 13, and the actuator 10 is assembled to or integrally connected with the cover 12, thus taking the form of the three-way valve.

Reference numerals 20 and 21 denote a bearing and an oil seal interposed between the shaft (not shown) of the actuator 10 and the shaft member 13*b* of the valve 13.

In yet another particular embodiment, the housing 11 includes the two inlet ports 15*a* and 15*b* and the outlet port 16. The three-way valve is connected to the radiator 14 through the two inlet ports 15*a* and 15*b* and connected to a fuel cell stack through the outlet port 16.

As shown in FIG. 4, two inlet ports 15*a* and 15*b* may define an included angle of 90° (i.e., the longitudinal axis of each inlet port are perpendicular to each other) and extend in the radial direction of the housing 11. As further shown, the outlet port 16 extends in the axial direction of the housing 11. The inlet port 15*a* may be connected to a bypass hose 18 extending from one end of an upper head 17 of the radiator 14, and the inlet port 15*b* is directly connected to one end of a lower head 19 of the radiator 14. The outlet port 16 is connected to a line (not shown) extending to the fuel cell stack.

That is, in this embodiment, the housing 11 of the three-way valve is disposed adjacent to one side of the bottom of the radiator 14, connected to an outlet of the radiator 14 through the inlet port 15*b*, and connected to the bypass hose 18 disposed in parallel to the side of the radiator 14 through the inlet port 15*a* extending upwardly at an angle of 90° with respect to the inlet port 15*b*.

The outlet port 16 of the housing 11 is connected to the line extending to the fuel cell stack.

Figure 5:
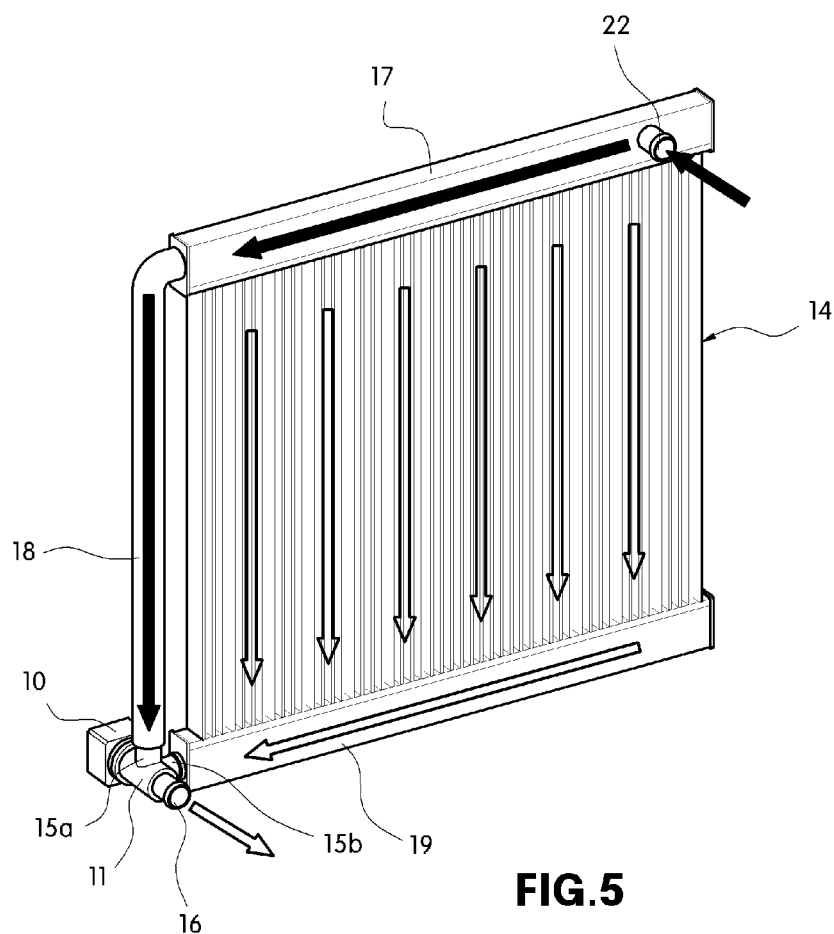
FIG. 5 is a perspective view showing the flow of coolant in the three-way valve integrated with a radiator in accordance with a preferred embodiment of the present invention and the radiator.

FIG. 4 is a perspective view showing the installation of the three-way valve integrated with a radiator in accordance with another preferred embodiment of the present invention. FIG. 5 is a perspective view showing the flow of coolant in the three-way valve integrated with a radiator in accordance with the preferred embodiment of FIG. 4 of the present invention.

As shown in FIGS. 4 and 5, the radiator 14 includes the upper head 17 and the lower head 19. The upper head 17 of the radiator 14 includes a radiator inlet 22 through which the coolant discharged from the fuel cell stack is introduced.

As further shown, the outlet of the radiator 14, i.e., one end of the lower head 19, is connected to the inlet port 15*b* of the housing 11, and the bypass hose 18 extending from the upper head 17 at the top of the radiator towards the bottom of the radiator is connected to the inlet port 15*a* of the housing 11.

Moreover, the outlet port 16 of the housing 11 can be connected to the fuel cell stack.

FIG. 5 depicts the flow of coolant through the radiator 14 according to a preferred embodiment of the invention. As shown, the coolant that is fed through the radiator inlet 22 of the radiator 14 by the operation of a pump (not shown) flows in the direction of the black arrow shown in FIG. 5. Here, hot water, cold water, and hot and cold water are selected in an appropriate manner by the opening and closing operation of the three-way valve and supplied to the fuel cell stack. More in particular, if inlet 15*b* is selected to be open (with inlet 15*a* closed), the flow path of the coolant will be from the upper head 17 of the radiator 14, through the radiator 14 to the lower head 19 and then to the three-way valve 13 through the inlet port 15*b*, thereby providing coolant having a lower temperature to the three-way valve. On the other hand, if the inlet 15*a* is selected to be open (with inlet 15*b* closed), the flow path of the coolant will be from the upper head 17 of the radiator 14, to the bypass hose 18, to the three-way valve 13 through the inlet 15*a*. Further, operation of the three-way valve can also include where both inlets 15*a* and 15*b* are partially open, to the same or different degrees.

Figure 6A:
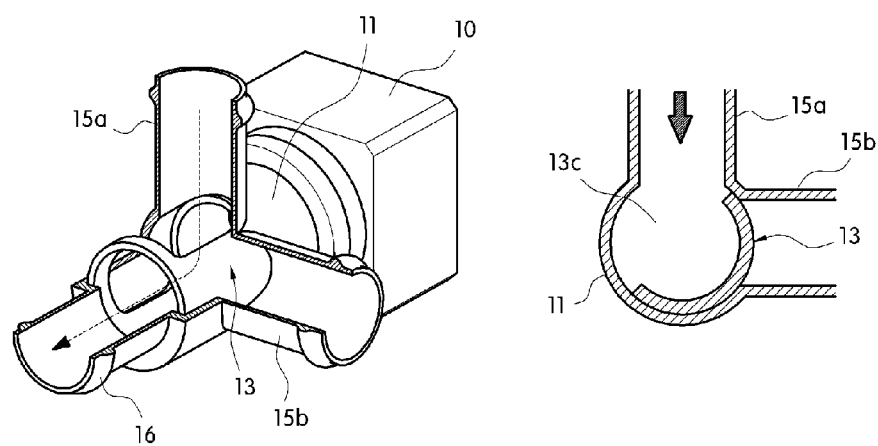
FIGS. 6A, 6B, and 6C are perspective views and cross-sectional views showing the operation of the three-way valve integrated with a radiator in accordance with a preferred embodiment of the present invention and the radiator.
Figure 6B:
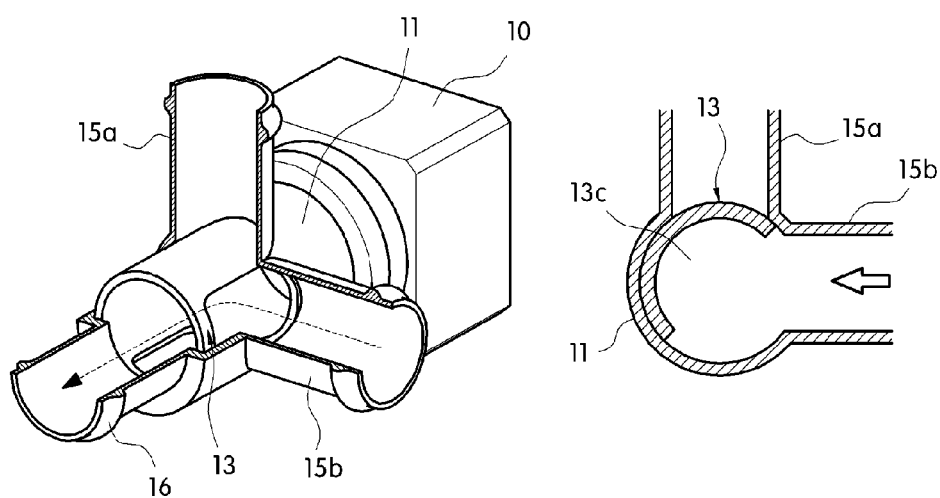
Figure 6C:
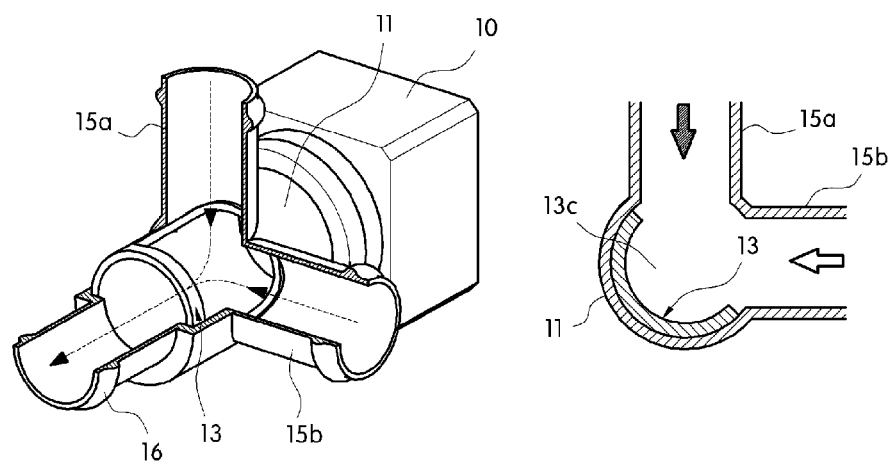

The operation of the three-way valve of the invention having the above-described configuration is depicted in FIGS. 6A to 6C.

FIGS. 6A, 6B, and 6C are perspective views and cross-sectional views showing the operation of the three-way valve integrated with a radiator in accordance with a preferred embodiment of the present invention and the radiator.

FIG. 6A shows the coolant bypass flow path from the upper head 18 of the radiator 14 through the bypass hose 18 to the inlet 15*a*.

During initial system start-up, the flow path 13*c* of the three-way valve is positioned to connect the inlet port 15*a* and the outlet port 16.

Accordingly at initial start-up, in reference to FIG. 5, the coolant is supplied from the radiator inlet 22 to the fuel cell stack through the upper head 17 of the radiator 14, then to the bypass hose 18, followed by the inlet port 15*a* of the housing 11, and finally through the outlet 16 of the housing 11. As shown in FIG. 6A, the flow of coolant is seen along the dotted arrow of flow path 13*c*, which forms a path that receives coolant through the inlet 15*a*, moving the coolant out of the valve 13 through outlet 16 to feed the fuel cell stack.

FIG. 6B shows the alternative flow path of coolant flowing through the radiator.

When the amount of heat generated by the fuel cell stack is increased after a period of time following the system start-up, the flow path 13*c* of the three-way valve is positioned to connect the inlet port 15*b* and the outlet port 16.

Accordingly, in reference to FIG. 5, the coolant is supplied from the radiator inlet 22 to the fuel cell stack through the upper head 17 of the radiator 14, then to the radiator 14, followed by the lower head 19 of the radiator 14, then to the inlet port 15*b* of the housing 11, and then to the outlet port 16 of the housing 11.

As shown in FIG. 6C, the hot water and cold water can also be properly mixed together by a temperature control means (not shown) to release coolant from the outlet 16 to be supplied to the fuel cell stack whereby the coolant has a temperature at which the output efficiency of the system is optimized.

Under these conditions during system activation, the flow path 13*c* of the three-way valve can be positioned to connect the two inlet ports 15*a* and 15*b* (to the same or different extents) and the outlet port 16.

Accordingly, under such conditions, the coolant to be supplied to the fuel cell stack is fed through the radiator inlet 22 and distributed by two flow paths. Thus, a portion of the coolant flows from the upper head 17 of the radiator 14 to the bypass hose 18 to the inlet 15*a*, and at the same time, another portion of the coolant flows from the upper head 17 through the radiator 14, to the lower head 19 of the radiator 14 and then into the valve via the inlet 15*b*. As a result, the coolant at the appropriate is supplied to the fuel cell stack through the outlet port 16 of the housing 11.

Another aspect of the invention relates to the control logic of the three-way valve of the invention. In the conventional TMS, the three-way valve receives a signal indicating the temperature of an inlet of the fuel cell stack from a fuel cell control unit (FCU) through a CAN communication line, which thereby controls the degree of opening of the valve to maintain the temperature of the coolant supplied to the fuel cell stack. The present invention contemplates utilizing the same control logic as the conventional rotary three-way valve.

As such, according to the three-way valve according to the invention, which is integrated with the outlet of the radiator to eliminate the bypass loop of the conventional TMS system, it is possible to achieve a compact structure of the radiator and the TMS module (such as fuel cell stack, pump, heater, three-way valve, etc.).

As described above, the three-way valve according to the present invention, which is integrated with the outlet of the radiator to eliminate the bypass loop from the existing system, includes the following effects:

(1) It is possible to reduce the manufacturing cost (about three to five hundred dollars per vehicle model) by a reduction in the number of parts (e.g., two silicon hoses and two pipes);

(2) It is possible to achieve a reduction in weight (about 3 to 5 Kg per vehicle model), and this effect is expected to increase when the amount of coolant reduced is considered);

(3) It is possible to increase the system space by the elimination of the bypass loop, thereby increasing the degree of freedom in system design;

(4) It is possible to improve the assembly, and the three-way valve can be easily attached to and detached from the system during maintenance and repair;

(5) It is possible to achieve a compact structure for the TMS module (the bypass loop and the radiator loop are additionally present outside the TMS module in the existing system); and (6) When the control logic to flow the coolant only through the radiator is performed when the amount of heat generated by the fuel cell stack is increased, it is possible to increase the high power operation.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A three-way valve integrated with a radiator, the three-way valve comprising:
    an actuator comprising a shaft;
    a housing comprising a first inlet port, a second inlet port, and an outlet port;
    a cover; and
    a valve mounted in the housing and rotatably connected to the shaft of the actuator to selectively control the first inlet port, the second inlet port and the outlet port of the housing,
    wherein the first inlet port is connected to a hot water that bypasses a radiator, the second inlet port is connected to a cold water from the radiator and the outlet port is connected to a fuel cell stack and the housing is integrally formed with one side of the radiator, and
    wherein the hot water and the cold water are mixed together within the three-way valve and then supplied to the fuel cell stack, and
    wherein the first inlet port is connected to an upper head of the radiator through a bypass hose extending from the upper head of the radiator and the second inlet port is directly connected to a lower head of the radiator.

2. The three-way valve of claim 1, wherein the first inlet port and the second inlet port of the housing define an included angle of 90° and extend in a radial direction of the housing and the outlet port extends in an axial direction of the housing.

3. The three-way valve of claim 1, wherein the valve comprises a cylindrical body and a shaft member integrally formed in a rear center of a body of the housing and which is connected to the shaft of the actuator, wherein the body of the valve comprises a flow path connected in the axial direction and in the radial direction.

* * * * *